(12) United States Patent
Doan et al.

(10) Patent No.: US 6,192,369 B1
(45) Date of Patent: Feb. 20, 2001

(54) OBJECT-ORIENTED PARADIGM FOR ACCESSING TRANSACTIONAL REQUESTS BY MODELING I/O MESSAGE QUEUES INTO AN OBJECT FRAMEWORK

(75) Inventors: Bach Dinh Doan, San Jose; Shyh-Mei Fang Ho, Cupertino; Jenny Y. Liao, San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/097,376

(22) Filed: Jun. 15, 1998

(51) Int. Cl.[7] ................ G06F 17/00; G06F 7/00
(52) U.S. Cl. ............... 707/103; 707/1; 707/100; 709/3
(58) Field of Search ............... 707/103, 1, 100; 709/313, 314, 319, 238, 316, 315

(56) References Cited

U.S. PATENT DOCUMENTS

| | | | |
|---|---|---|---|
| 4,615,001 | * 9/1986 | Hudgins, Jr. | 364/200 |
| 5,455,948 | * 10/1995 | Poole et al. | 395/650 |
| 5,761,494 | * 6/1998 | Smedley et al. | 395/604 |
| 5,765,161 | * 6/1998 | Blackman et al. | 707/103 |
| 5,797,005 | * 8/1998 | Bahls et al. | 395/680 |
| 5,799,313 | * 8/1998 | Blackman et al. | 707/103 |
| 5,854,750 | * 12/1998 | Phillips et al. | 364/478.04 |
| 6,018,743 | * 1/2000 | Xu | 707/103 |

OTHER PUBLICATIONS

Dieter Gawlick, "Messaging/Queueuing in Orace8", IEEE 1998.*
Kirsche et al, "Cooperative Problem Solving using Database Conversations", IEEE 1994.*

* cited by examiner

*Primary Examiner*—Thomas G. Black
*Assistant Examiner*—Uyen Le
(74) *Attorney, Agent, or Firm*—Gates & Cooper

(57) ABSTRACT

A method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

27 Claims, 4 Drawing Sheets

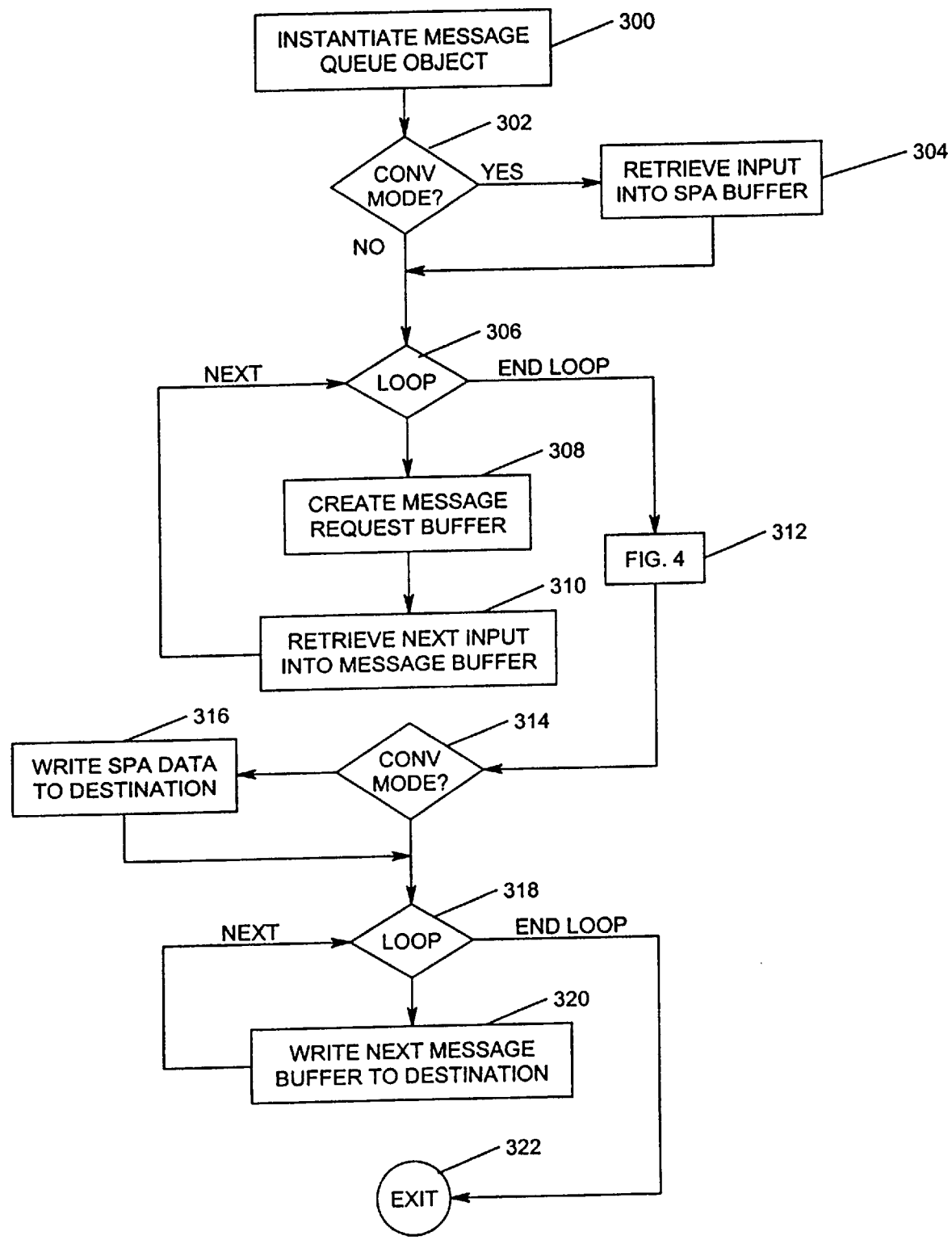

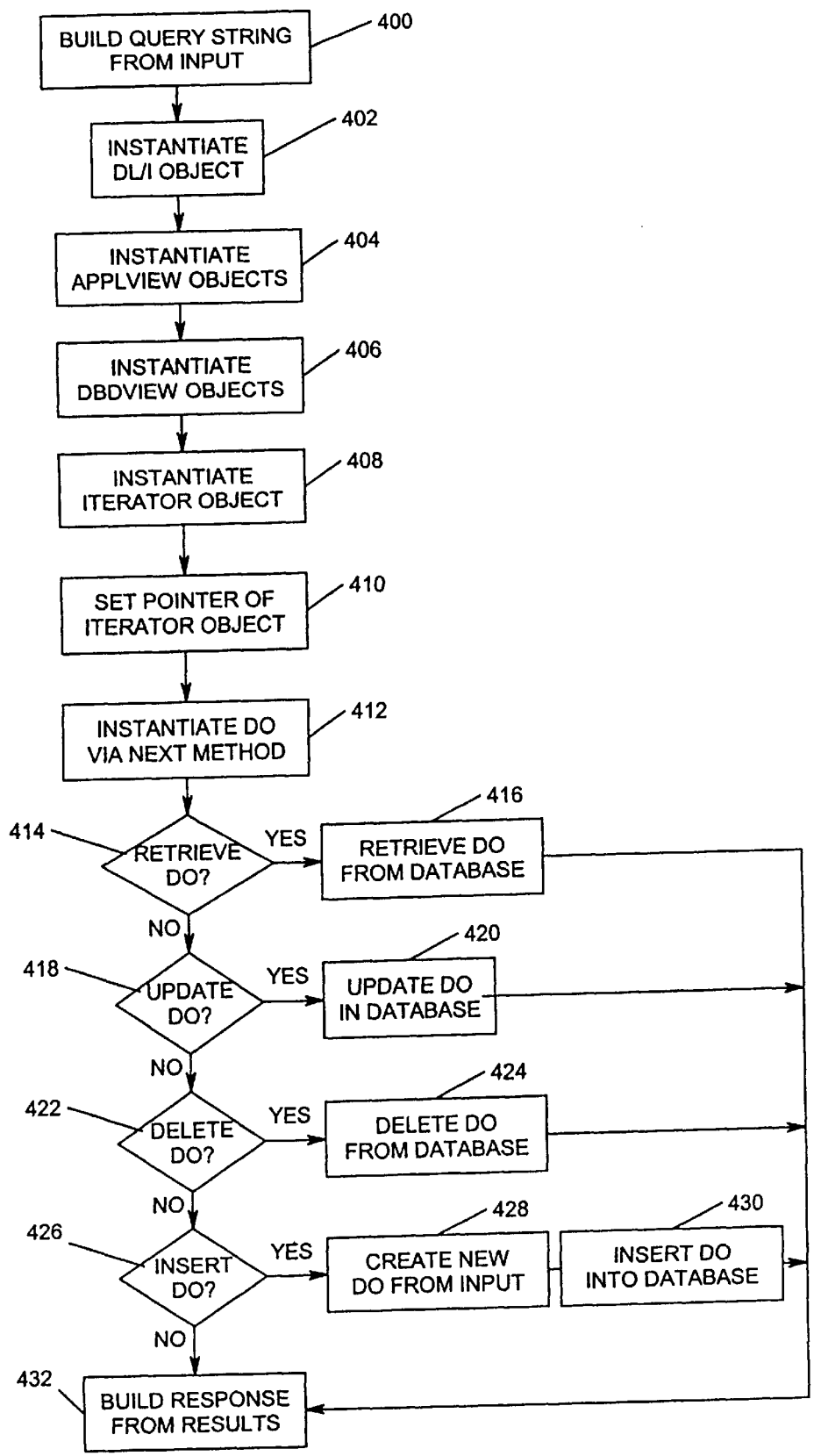

OBJECT-ORIENTED PARADIGM FOR ACCESSING TRANSACTIONAL REQUESTS BY MODELING I/O MESSAGE QUEUES INTO AN OBJECT FRAMEWORK

CROSS-REFERENCE TO RELATED APPLICATIONS

This application is related to the following co-pending and commonly assigned patent applications:

Utility application Ser. No. 09/070,071, entitled "AN EXECUTION PARADIGM FOR ACCESSING HIERARCHICAL DATA USING AN OBJECT FRAMEWORK," filed on Apr. 30, 1998, by Kenneth R. Blackman, Shyh-Mei F. Ho, and Thomas Beavers Sander;

Utility application Ser. No. 09/070,274, entitled "A GENERIC EXECUTION MODEL FOR ISOLATING APPLICATIONS FROM UNDERLYING DATABASES," filed on Apr. 30,1998, by Kenneth R. Blackman, Shyh-Mei F. Ho, and Thomas Beavers Sander;

Utility application Ser. No. 09/070,528, entitled "AN OBJECT-ORIENTED PROGRAMMING MODEL FOR ACCESSING HIERARCHICAL DATABASES," filed on Apr. 30,1998, by Bach Dinh Doan and Shyh-Mei F. Ho;

Utility application Ser. No. 09/070,273, entitled "AN INTERNET-ENABLED GENERIC APPLICATION PROGRAM FOR ACCESSING HIERARCHICAL DATA," filed on Apr. 30,1998, by Bach Dinh Doan and Shyh-Mei F. Ho;

Utility application Ser. No. 09/070,227, entitled "GENERATING AN INTERNET APPLICATION FOR ACCESSING A HIERARCHICAL DATABASE," filed on Apr. 30, 1998, by Attila J. Fogarasi, Shyh-Mei F. Ho, Wai-Lee D. Ling, and Kevin M. McBride;

Provisional Application Ser. No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson;

Utility application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, which claims the benefit under 35 U.S.C. §119(e) of Provisional Application Ser. No. 60/067,292 above;

Utility application Ser. No. 08/949,638, entitled "A USER INTERFACE FOR CREATING CLASS DEFINITIONS AND IMPLEMENTATIONS FOR DATABASE PERSISTENT OBJECTS," filed on Oct. 14,1997, by Mark Alan Bach, Shyh-Mei F. Ho, Kevin Michael McBride, H. Moncrief Rowe-Anderson and Thomas Beavers Sander, now U.S. Pat. No. 5,924,101, issued Jul. 13, 1999;

Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739, issued Jul. 14, 1998;

Utility application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313, issued Aug. 25, 1998;

Utility application Ser. No. 08/736,763, entitled "A METHOD FOR REPRESENTING NON-OBJECT-ORIENTED DATABASES USING A COLLECTION OF COLLECTIONS DATA MODEL," filed on Oct. 25,1996, by Kenneth R. Blackman and Jack L. Howe III, now U.S. Pat. No. 5,794,248, issued Aug. 11, 1998;

Utility application Ser. No. 08/738,294, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on October 25, 1996, by Kenneth R. Blackman and Jack L. Howe III, now U.S. Pat. No. 5,781,907, issued Jul. 14, 1998;

Utility application Ser. No. 08/738,104, entitled "A QUERY SYNTAX FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778, 379, issued Jul. 7, 1998;

Utility application Ser. No. 08/738,082, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778, 358, issued Jul. 7, 1998;

Utility application Ser. No. 08/738,330, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III, now U.S. Pat. No. 5,787,436, issued Jul. 28, 1998;

Utility application Ser. No. 08/736,759, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, now U.S. Pat. No. 5,794,247, issued Aug. 11, 1998;

Utility application Ser. No. 08/736,764, entitled "A METHOD FOR ENCAPSULATING DATA FROM NON-OBJECT-ORIENTED DATABASES AS DATABASE PERSISTENT OBJECTS," filed on Oct. 25,1996, by Kenneth R. Blackman and Jack L. Howe III, now U.S. Pat. No. 5,765, 161, issued Jun. 9, 1998;

Utility application Ser. No. 08/738,103, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III, now U.S. Pat. No. 5,765, 163, issued Jun. 9, 1998;

Utility application Ser. No. 08/736,983, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R. Blackman and Jack L. Howe III, now U.S. Pat. No. 5,761,671, issued Jun. 2, 1998;

Utility application Ser. No. 08/736,952, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III, now U.S. Pat. No. 5,765, 162, issued Jun. 9, 1998;

Utility application Ser. No. 08/736,765, entitled "A METHOD FOR CATALOGING DATABASE CHARAC- TERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597, issued Apr. 7, 1998;

Utility application Serial No. 09/047,786, entitled "A METHOD FOR CATALOGING DATABASE CHARACTERISTICS AND DEFINING AND GENERATING DATABASE PERSISTENT OBJECTS," filed on Mar. 25,1998, by Kenneth R. Blackman and Jack L. Howe III, which is a continuation of Utility application Ser. No. 08/736,765 above;

Utility application Ser. No. 08/736,922, entitled "A METHOD FOR CAPTURING AND CATALOGING DATABASE CHARACTERISTICS TO DEFINE DATABASE PERSISTENT OBJECTS," filed on Oct. 25,1996, by Kenneth R. Blackman and Jack L. Howe III, now U.S. Pat. No. 5,809,508, issued Sep. 15, 1998;

Utility application Ser. No. 08/738,102, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III, now U.S. Pat. No. 5,737,598, issued Apr. 7, 1998;

Utility application Ser. No. 08/738,105, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III, now U.S. Pat. No. 5,809,509, issued Sep. 15, 1998; and Utility application Ser. No. 08/736,761, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III, now U.S. Pat. No. 5,764,979, issued Jun. 9, 1998;

all of which applications are incorporated by reference herein.

BACKGROUND OF THE INVENTION

1. Field of the Invention

The present invention relates generally to computerized methods for accessing databases, and in particular, to a computerized object-oriented method for accessing transactional requests for a database by modeling I/O message queues into an object framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrappering, implemented in such products such as IBM's VisualAge™ IMS Connection. Transaction wrappering creates a class having methods that retrieve data from the IMS™ database, create an object embodying the retrieved data, and manipulate the object in an object-oriented application program. The problem with this approach is that each object-oriented application requires substantial additional coding, both object-oriented and non-object-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMS™ database, does not map well to a relational database.

Thus, there is a need in the art for improved techniques for accessing hierarchical data using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIGS. 3 and 4 together are a flowchart illustrating the steps performed by the application program and objects framework according to the present invention.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention introduces a new execution paradigm for accessing hierarchical databases, such as an IMST™ database, by modeling the database into an objects framework and providing the mechanisms that allow object-oriented application programs to access the database data using standard tools, such as the DL/I™ query language for the IMS™ database. The objects framework instantiates IMS™ data objects upon demand from application programs and manages those objects from creation to deletion. Further, the objects framework uses these objects to dynamically construct DL/I™ calls from application program requests.

The objects framework can be used in a number of different environments, such as: (1) DL/I™ batch processing and (2) on-line transactions including both IMS™ and CICS™ transactions. Moreover, the objects framework can be executed in any MVS address space, including IMS and non-IMS address spaces, such as web server address spaces.

The objects framework also introduces a new paradigm to process IMS™ transactions from object-oriented IMS™ transactional application programs. Without the present invention, IMS™ transactional application program would need to include programming for existing procedural interfaces to access IMS™ message queues using DL/I™ calls with program communication blocks (PCBs).

The present invention provides object-oriented interfaces to the IMS™ Transaction Manager™ message queues to eliminate complicated message queue programming in the application program. The present invention models IMS™ message queue processing into objects for both conversational and non-conversational message processing. This invention not only eliminates DL/I™ coding with teleprocessing PCBs (i.e., I/O PCBs and alternate PCBs) to access IMS™ transactional message requests, it also constructs message request buffers and response buffers, including a scratch pad area (SPA).

Thus, the present invention offers improved IMS™ application programming productivity through the use of object-oriented programming techniques. The present invention eliminates the need for complicated IMS™ transactions and DL/I™ programming.

Hardware Environment

Figure 1:
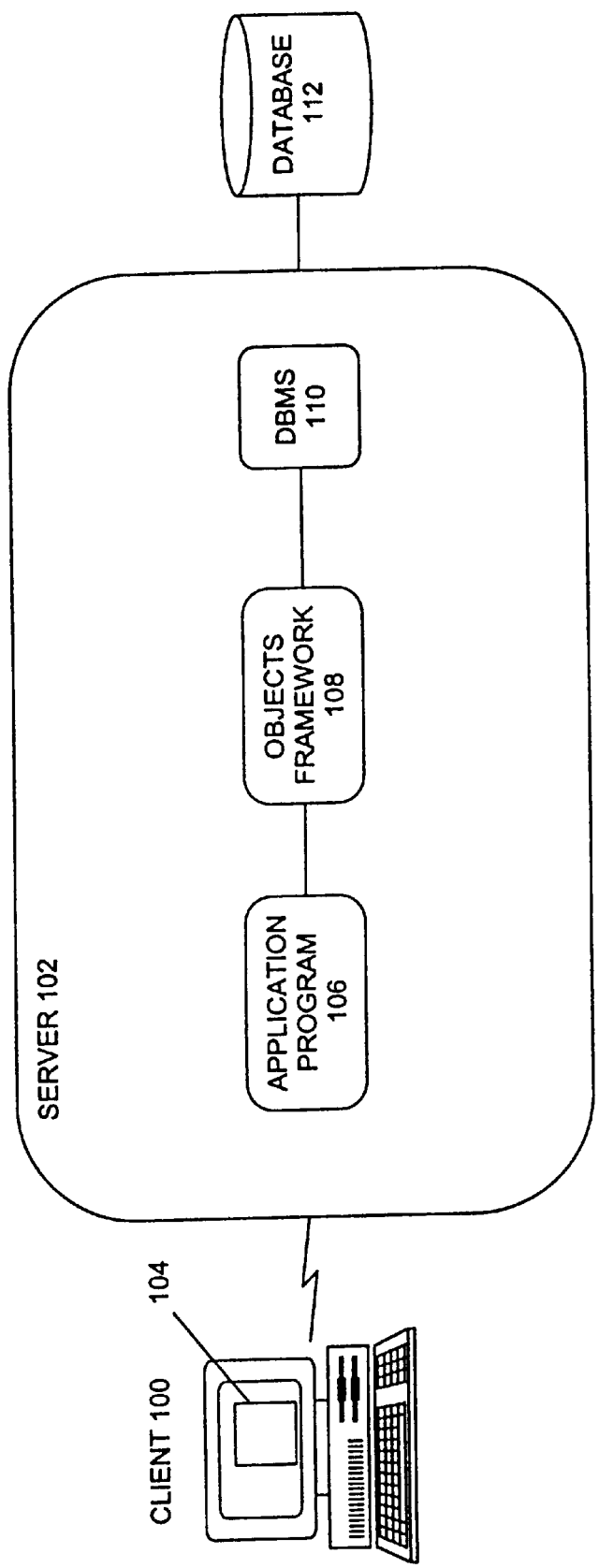
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such as data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
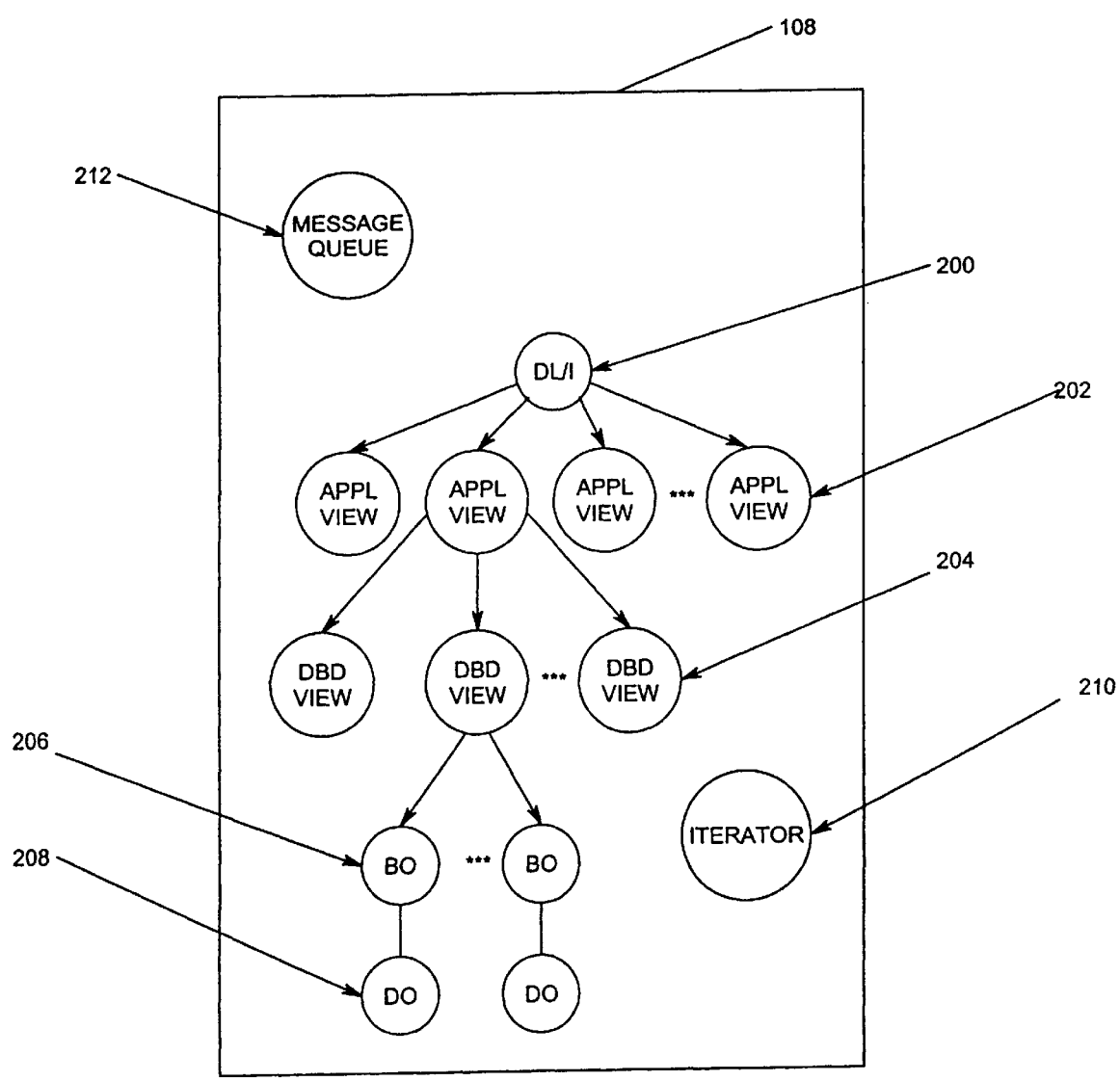
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system, as well as IMS™ Transaction Manager™ message queues.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, an iterator object 210, and one or more message queue objects 212.

The application program 106 first loads the objects framework 108 class library. The objects framework 108 receives IMS™ transaction requests from a requestor via one or more instantiated message queue objects 212. The objects framework 108 then dynamically instantiates a DL/I™ object 200, one applView object 202, and one dbdView object 204. The objects framework 108 also dynamically loads the class library for the BOs 206 and DOs 208 requested by the application program 106 to create an iterator object 210. The iterator object 210 instantiates the BOs 206 and their corresponding DOs 208 during execution. After execution, responses are returned to the requestor as IMS™ transaction responses via the instantiated message queue objects 212.

All the class objects, except the iterator class 210 and the message queue class 212, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects in the tree structure encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a BO 206 may be instantiated with a DO 208 to provide business logic for the application program 106. In such an embodiment, the application program 106 accesses the business logic via the BO 206, which in turn invokes the methods of its corresponding DO 208 to perform the necessary operations on the database 112, to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the application program 106 uses a DL/I™ query string to access the IMS™ database 112. The application program 106 first instantiates a desired applView object 202. If the associated DL/I™ object 200 has not been instantiated yet, this also results in its instantiation as the root of the objects framework 108 and the root for the collection of applView objects 202 in the IMS™ database 112. The application program 106 then provides the DL/I™ query string to an "evaluate" method of the applView object 202, and the applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 102. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/IT™ operations (e.g., retrieve, update, delete and insert) using methods of the BOs 206. The BO 206 will, in turn, invoke the methods of its corresponding DO 208 to perform actual DL/I calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS( )
UpdateToDS( )
InsertToDS( )
DeleteFromDS( )

In a preferred embodiment, only the above four methods will result in actual I/O operations on the database 112.

Message Queue Object

The message queue class 212 models IMST™ Transaction Manager™ input and output message queues as objects. The message queue class includes, among others, "retrieveMsg" and "writeMsg" methods that allow transactional application programs 106 to retrieve messages from an IMS™ message queue, and then write responses to an originator via the same IMS™ message queue, and/or to another destination via other IMS™ message queues. Both request and response buffers are constructed dynamically by the message queue objects.

The message queue objects 212 support both conversational and nonconversational application programs 106 to allow the application programs 106 to selectively access scratch pad area (SPA) data in conversational mode. The message queue objects 212 also allows an output message to be displayed on a formatted screen by optionally supporting the message output descriptor (MOD) on the writeMsg method.

The object message objects 212 are also capable of supporting multiple message segments. Request buffers are allocated and created dynamically upon demand by application programs. Moreover, default sizes are provided for both SPA data and input message data. Therefore, if a buffer size is not specified by the application, the maximum default size will be used.

The same message request object can also be used to write SPA data and output message data back to the originator. However, output responses can also be written to a different destination by creating a separate message queue object with the specified destination.

Example Application Program

Following is a sample object-oriented application program 106 according to the present invention:

```
// application program
main()
{
    long rc; // return code
    // instantiate a message queue object
    msgQueue mq (conversational_mode, input_length, spa_length)
    // if conversational mode, then create a SPA request buffer and
    // retrieve data from the SPA
    If conversational_mode = 1
    {
        rc = mq.retrieveMsg(SpaBuffer);
    }
    //create message buffer and retrieve data from input message queue
    rc = mq.retrieveMsg(MessageBuffer);
        //parse the input for an application view, query string,
        // and/or desired operation
        process_input(MessageBuffer);
        // instantiate desired applView object (and DL/I object if
        necessary)
        applView_SSM applView(applViewName);
        // Dynamically build the DL/I query string based on the input
        build_query_string(MessageBuffer);
        // instantiate iterator object and pointer using applView object's
        // "evaluate" method and query string
        iterator* ltr = applView.evaluate(queryString);
        // use "next" method to instantiate a BO and its corresponding DO
        BO*pObj = ltr->next();
        //use indicated methods to retrieve, update, delete, or
        // insert BOs and DOs
        switch(operation)
        {
          // Retrieve DO
          case 0: pObj->RetrieveFromDS();
             break;
          // Update DO
          case 1: pObj->UpdateToDS();
             break;
          // Delete DO
          case 2: pObj->DeleteFromDS();
             break;
          //Insert DO
          case 3: DO*pObj=ltr->newObject();
             pObj->InsertToDS();
             break;
        }
        // Dynamically build the response
        build_response(MessageBuffer);
        // if conversational mode, then write SPA request buffer
        If conversational_mode = 1
        {
            rc = mq.sendMsg(SpaBuffer);
        }
        // send output data to the original message queue
        rc = mq.sendMsg(MessageBuffer, output_length);
        // instantiate alternative message queue object
        msgQueue alternative_mq (conversational_mode, input_length,
            spa_length)
        // send output data to the alternative message queue
        rc = alternative_mq.sendMsg(MessageBuffer, output_length);
}
```

Following is an example DL/I™ query string that could be used by the object-oriented application program 106 to retrieve DOs 208 from the database 112:

SELECT doClassNameC
FROM databaseViewName
WHERE doClassNameA.keyname relop keyvalue,
    doClassNameB.keyname relop keyvalue,
    doClassNameC.keyname relop keyvalue
where "relop" is a relational operator, such as:
    EQ or = or =
    GT or > or >
    LT or < or <
    GE or >= or =>
    LE or <= or =<
    NE or != or =!
    AND or & or *
    OR or | or +

Logic of the Application Program

FIGS. 3 and 4 together are a flowchart illustrating the steps performed by the application program 106 and objects framework 108 according to the present invention.

Referring to FIG. 3, Block 300 represents the application program 106 instantiating a message queue object 212 for the originator (e.g., terminal or program) in the memory of the server computer 102.

Block 302 is a decision block that represents the application program 106 determining whether the application is in conversational mode. If so, control transfers to Block 304; otherwise, control transfers to Block 306.

Block 304 represents the application program 106 creating a SPA buffer in the memory of the server computer 102 and retrieving input from the originator into the SPA buffer via the message queue object 212.

Blocks 306–310 are a loop for reading multiple message segments of an input message from the message queue object 212, wherein request buffers are allocated and created dynamically by the application program 106 in the memory of the server computer 102. Block 308 represents the application program 106 dynamically creating one or more message request buffers using the message queue object 212 (308) and Block 310 represents the application program 106 retrieving one or more message segments from the message queue object 212 into the message request buffer.

After reading all the message segments, control transfers to Block 312, which represents the application program 106 processing the input message. This processing is further described in conjunction with FIG. 4. After the processing is completed, control transfers to Block 314.

Block 314 is a decision block that represents the application program 106 determining whether it is operating in conversational mode. If so, control transfers to Block 316; otherwise, control transfers to Block 318.

Block 316 represents the application program 106 writing the SPA buffer to a destination via the message queue object 212.

Blocks 318–320 represent a loop for writing multiple message segments to the destination via its message queue object 212. The destination could be the same as the originator (and thus use the same message queue object 212) and/or it could be different from the originator (and thus use a different message queue object 212). Block 320 represents the application program 106 writing one or more message segments to the destination's message queue object 212.

Finally, Block 322 represents the end of the logic.

Referring to FIG. 4, Block 400 represents the application program 106 parsing the input message, and dynamically constructing a DL/I™ query string based on the user input.

Block 402 represents the DL/I™ object 200 of the objects framework 108 being instantiated in the memory of the server computer 102. Usually, this occurs either when the objects framework 108 is loaded or when the application program 106 first requests an applView object 202.

Block 404 represents the application program 106 instantiating the requested applView object 202 in the memory of the server computer 102.

Block 406 represents the dbdView objects 204 of the objects framework 108 being instantiated in the memory of the server computer 102. Usually, this occurs either when the objects framework 108 is loaded or when the application program 106 first requests an applView object 202.

Block 408 represents the application program 106 instantiating the iterator object 210 in the memory of the server computer 102 and then setting its object pointer by invoking the "evaluate" method with a DL/I™ query string.

Block 410 represents the application program 106 setting the pointer of the iterator object 210 in the memory of the server computer 102.

Block 412 represents the application program 106 invoking the "next" member function or method of the iterator object 210 to instantiate/materialize a DO 208 and/or BO 206 in the memory of the server computer 102.

Block 414 is a decision block that represents the application program 106 determining whether the requested operation is a request to retrieve a DO 208. If so, control transfers to Block 416; otherwise, control transfers to Block 418. Block 416 -28 represents the application program 106 retrieving data from the database 112 via a method of the DO 208. Thereafter, control transfers to Block 432.

Block 418 is a decision block that represents the application program 106 determining whether the requested operation is a request to update a DO 208. If so, control transfers to Block 420; otherwise, control transfers to Block 422. Block 420 represents the application program 106 updating data in the database 112 via a method of the DO 208. Thereafter, control transfers to Block 432.

Block 422 is a decision block that represents the application program 106 determining whether the requested operation is a request to delete a DO 208. If so, control transfers to Block 424; otherwise, control transfers to Block 426. Block 424 represents the application program 106 deleting data from the database 112 via a method of the DO 208. Thereafter, control transfers to Block 432.

Block 426 is a decision block that represents the application program 106 determining whether the requested operation is a request to insert a DO 208. If so, control transfers to Block 428; otherwise, control transfers to Block 432. Block 428 represents the application program 106 creating or instantiating a new DO 208 and Block 430 represents the application program 106 inserting data into the database 112 via a method of the DO 208. Thereafter, control transfers to Block 432.

Block 432 represents the application program 106 building a response to the input message from the results of the prior operations.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrapper the data retrieved from the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accessing a database, comprising:
    (a) modeling a database system into an objects framework, wherein the objects framework corresponds to one or more application views, database definitions, and data defined and stored in the database system, and one or more message queues for communicating with the database system, and the modeling step further comprises modeling message queue processing in a transaction system using message queue objects; and
    (b) processing transactions from an application program through the objects framework using the message queue objects.

2. The method of claim 1, wherein an originating message queue object is different from a destination message queue object.

3. The method of claim 1, wherein the modeling step (a) further comprises modeling both conversational and non-conversational message queue processing in a transaction system using the message queue objects.

4. The method of claim 1, wherein the modeling step (a) further comprises modeling input and output message queues in a transaction system as the message queue objects.

5. The method of claim 1, wherein the message queue objects include one or more methods that allow the application program to retrieve a message from the input message queue.

6. The method of claim 1, wherein the message queue objects include one or more methods that allow the application program to send a message to the output message queue.

7. The method of claim 1, further comprising constructing message request buffers and message response buffers using the message queue objects.

8. The method of claim 1, wherein the message queue objects support one or more message segments.

9. The method of claim 1, wherein an originating message queue object is a destination message queue object.

10. A computerized apparatus for accessing a database, comprising:

(a) means for modeling a database system into an objects framework, wherein the objects framework corresponds to one or more application views, database definitions, and data defined and stored in the database system, and one or more message queues for communicating with the database system, and the means for modeling further comprises means for modeling message queue processing in a transaction system using message queue objects; and (b) means for processing transactions from an application program through the objects framework using the message queue objects.

11. The apparatus of claim 10, wherein an originating message queue object is different from a destination message queue object.

12. A program storage medium readable by a computer, the medium embodying one or more instructions executable by the computer to perform method steps for accessing a database, the method comprising:

(a) modeling a database system into an objects framework, wherein the objects framework corresponds to one or more application views, database definitions, and data defined and stored in the database system, and one or more message queues for communicating with the database system, and the modeling step further comprises modeling message queue processing in a transaction system using message queue objects; and (b) processing transactions from an application program through the objects framework using the message queue objects.

13. The program storage medium of claim 12, wherein the modeling step (a) further comprises modeling both conversational and non-conversational message queue processing in a transaction system using the message queue objects.

14. The apparatus of claim 10, wherein the means for modeling further comprises means for modeling both conversational and non-conversational message queue processing in a transaction system using the message queue objects.

15. The apparatus of claim 10, wherein the means for modeling further comprises means for modeling input and output message queues in a transaction system as the message queue objects.

16. The apparatus of claim 10, wherein the message queue objects include one or more methods that allow the application program to retrieve a message from the input message queue.

17. The apparatus of claim 10, wherein the message queue objects include one or more methods that allow the application program to send a message to the output message queue.

18. The apparatus of claim 10, further comprising means for constructing message request buffers and message response buffers using the message queue objects.

19. The apparatus of claim 10, wherein the message queue objects support one or more message segments.

20. The apparatus of claim 11, wherein an originating message queue object is a destination message queue object.

21. The program storage medium of claim 12, wherein the modeling step (a) further comprises modeling input and output message queues in a transaction system as the message queue objects.

22. The program storage medium of claim 12, wherein the message queue objects include one or more methods that allow the application program to retrieve a message from the input message queue.

23. The program storage medium of claim 12, wherein the message queue objects include one or more methods that allow the application program to send a message to the output message queue.

24. The program storage medium of claim 12, further comprising constructing message request buffers and message response buffers using the message queue objects.

25. The program storage medium of claim 12, wherein the message queue objects support one or more message segments.

26. The program storage medium of claim 12, wherein an originating message queue object is a destination message queue object.

27. The program storage medium of claim 12, wherein an originating message queue object is different from a destination message queue object.

\* \* \* \* \*